Figure 1:
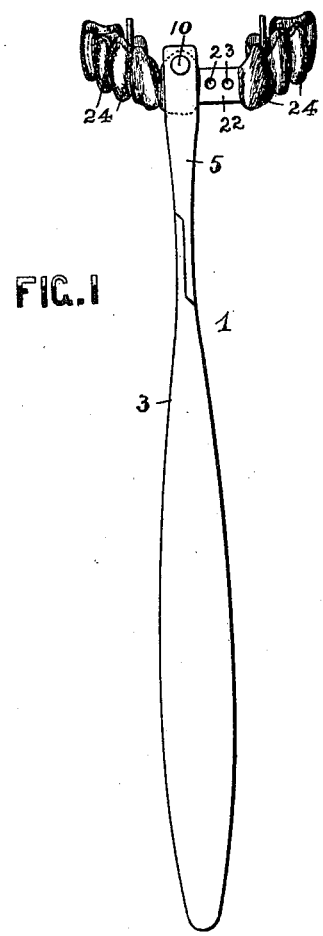

No. 684,984. Patented Oct. 22, 1901.
J. C. GRAFT.
DENTIST'S TOOL.
(Application filed June 26, 1900. Renewed Apr. 2, 1901.)
(No Model.)

WITNESSES:
Geo. D. Richards
Marcy Z. Trusdell

INVENTOR:
JOHN C. GRAFT
BY
Fred C. Fraentzel,
ATTORNEY

THE NORRIS PETERS CO., PHOTO-LITHO., WASHINGTON, D. C.

UNITED STATES PATENT OFFICE.

JOHN C. GRAFT, OF NEWARK, NEW JERSEY.

DENTIST'S TOOL.

SPECIFICATION forming part of Letters Patent No. 684,984, dated October 22, 1901.

Application filed June 26, 1900. Renewed April 2, 1901. Serial No. 54,096. (No model.)

*To all whom it may concern:*

Be it known that I, JOHN C. GRAFT, a citizen of the United States, residing at Newark, in the county of Essex and State of New Jersey, have invented certain new and useful Improvements in Dentists' Tools; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

This invention has reference to improvements in tools for dentists' use; and the primary object of this invention is to provide a novel construction of tool in the form of pliers, pincers, or riveting device, which can be conveniently used for properly securing porcelain teeth to a backing employed in what is known by dentists as "bridgework" and "platework" and which is especially of great benefit and advantage to dentists in the repairing of bridgework and platework when it is necessary to replace a broken porcelain tooth by a new one, should such breakage occur after a tooth has once been applied to the backing whether in a single-tooth backing or in bridgework.

In the art of securing porcelain teeth to a backing, as in bridgework or in single-tooth work, a metallic backing is employed, which is provided with one or more holes or perforations, and the porcelain tooth is provided with rearwardly-extending metallic pins or lugs, usually of platinum, which are inserted in the holes or perforations in the said backing and have their projecting ends riveted down against said backing and then burnished off. In this manner the porcelain tooth is secured in its proper position upon the backing. In ordinary use a person will often break one or more of the porcelain teeth, and it then becomes necessary to replace such broken porcelain tooth by a new one. In order that such newly-selected porcelain tooth which is to take the place of the broken porcelain tooth may be properly secured in position upon the backing, I have produced the tool to be hereinafter more fully described and which is illustrated in the accompanying drawings.

My invention therefore consists in the novel dentist's tool to be hereinafter more fully set forth for securing porcelain teeth in position upon a backing whether for single-tooth work or for bridgework, the use of which is equally well adapted for new work, as well as repair work.

My invention consists, furthermore, in such novel arrangements and combinations of the parts comprising the tool, all of which will be hereinafter more fully described and then finally embodied in the clauses of the claim.

The invention is clearly illustrated in the accompanying drawings, in which—

Figure 2:
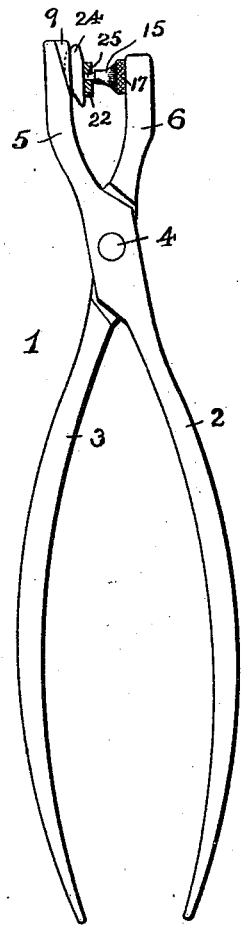
Figure 4:
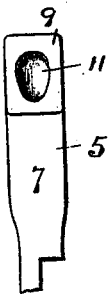
Figure 5:
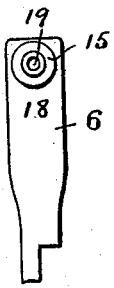
Figures 3, 6, 7:
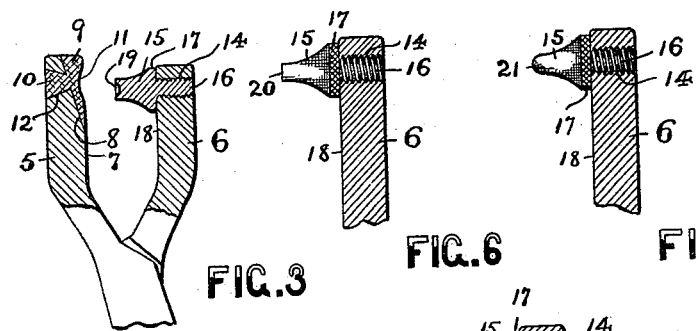
Figure 7A:
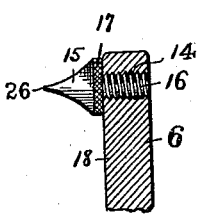

Figure 1 is a face view of a dentist's bridge with several porcelain teeth in position thereon and one tooth removed and an edge view of the tool embodying the principles of my invention, illustrating its use in connection with the bridge represented; and Fig. 2 is a side view of the tool, the jaws thereof being represented in their respective positions when in the act of securing a porcelain tooth against the backing, such tooth being represented in side elevation and the backing in vertical cross-section through one of the holes or perforations therein. Fig. 3 is a sectional view, on an enlarged scale, of the two jaw portions of the tool, one of said jaws being provided with a supporting-cushion of a soft metal and the other jaw being provided with a clenching or riveting stud removably secured in position on said jaw. Figs. 4 and 5 are side views of the inner faces of the two jaws represented in said Fig. 3. Fig. 6 is a sectional view of one of the jaws of the tool provided with a flattening-stud removably connected therewith, and Fig. 7 is a similar view of the said jaw provided with a burnishing-stud in place of the riveting-stud represented in Figs. 2 and 3 or the flattening-stud represented in said Fig. 6. Fig. 7ª is a view of still another form of stud to be employed with one of the jaws of the tool, said stud being used as a centering device or for removing a stud or pin from the backing in the repairing of a dentist's "bridge."

Similar numerals of reference are employed in all of the said above-described views to indicate corresponding parts.

In the said above-described drawings, 1 indicates the complete tool, which consists, essentially, of a pair of handle portions 2 and 3, pivotally connected at 4 by means of a pin or rivet, substantially as illustrated. The said portion 2 is provided with a forwardly-extending jaw-section 5, and the portion 3 is provided with a jaw-section 6. The inner face 7 of the jaw-section 5 is preferably provided with an inclined or tapering surface 8, upon which I have secured a supporting-cushion 9. This cushion is preferably made of a soft metal, such as lead, and has a projection 10, by means of which it can be suitably attached in a perforation 12 in said section 5, substantially as illustrated in Fig. 3. Of course it will be evident, however, that this cushion may be otherwise attached against the inner face of said jaw-section 5. The soft-metal cushion is provided in its face with a recessed or concaved portion 11, which approximately corresponds to the curvature of the face of the porcelain teeth, or nearly so, so that the cushion can be safely placed against the face of a tooth, and pressure applied, without the least danger of destroying the porcelain finish. This arrangement of the recess or socket 11 also allows of the jaw-section 5 to be properly manipulated against the face of the tooth, when the stud upon the other jaw-section 6 of the tool is brought, at different angles, against the end of the fastening or holding pin of the tooth during the riveting, flattening, and burnishing operations in the manner to be hereinafter fully described. The other jaw-section 6 of the tool 1, as will be seen from the several figures of the drawings, is provided with a screw-threaded hole 14 near its free end, and secured in the said screw-threaded hole is the screw portion 16 of a stud 15. This stud when screwed in position has a shoulder or other similarly-constructed stop portion 17, firmly arranged against the inner face 18 of the jaw-section 6, as indicated. With each jaw-section 6 I prefer to use several of such studs 15, the one represented in Fig. 3 having in its free end a curved recess or socketed portion 19, which is for the purpose of providing a slight head upon the pin connected with the porcelain tooth and for riveting the same against the back of the metal backing in the manner to be described. The stud 15 (represented in Fig. 6) has a flat end surface 20, which is for the purpose of flattening out the head of said pin on the tooth against the backing, and the stud 15 (represented in Fig. 7) has a spherical portion 21, which is used for burnishing purposes. These several studs are interchangeably secured in position upon the jaw-section and may also be replaced by studs of other shapes, (not here illustrated,) as will be clearly evident.

The manner of using the tool for attaching a porcelain tooth is as follows: In Figs. 1 and 2 of the drawings, 22 indicates the metal backing, that herein shown being employed in what is known by dentists as a "bridge." This backing, whether for a single tooth or whether for bridgework, as here indicated, is provided in the usual manner with suitably-disposed holes or perforations 23, in which are arranged certain pins or studs 25, which project from the backs of the porcelain teeth 24. The pins or studs 25 have their ends slightly projecting from the back of the backing 22, and it is for the purposes of first forming a small head on the back of each stud or pin 25 that the stud 15 (represented in Fig. 3) is first employed. Then by employing the stud 15, provided with the flat surface 20, (indicated in Fig. 6,) the said head on the pin 25 is next flattened out against the back surface of the backing 22, and finally by using the stud 15 with the spherical end 21 (indicated in Fig. 7) the said flattened-out portion of the pin 25 is burnished and furnishes with the back surface of the backing 22 a finished appearance. When the stud 15 is to be used as a centering or piercing means for removing the pin or stud 25 of a broken porcelain tooth from the backing 22, the said stud 15 has a sharp point 26, as clearly represented in Fig. 7ª. Its use will be evident from an inspection of said Fig. 7ª.

From the above description it will be evident that I have produced a simply-constructed tool which can be easily employed for securing false teeth to a backing, whether in new work or repair work. In the latter case when a tooth has been broken all that is necessary is to remove the old pins 25, which may remain in the perforations 23 in the backing 22, in any suitable manner, and a new tooth can be placed in position, its pins 25 then being secured in place by the use of my novel construction of tool in the manner hereinabove described.

I am aware that some changes may be made in the several arrangements and combinations of the parts of the tool without departing from the scope of my invention. Hence I do not limit my invention to the exact arrangements and combinations of the parts as herein described and as illustrated in the drawings; nor do I confine myself to the exact details of the construction of the several parts.

Having thus described my invention, what I claim is—

1. A dentist's tool for attaching porcelain teeth to a backing, comprising a pair of pivoted jaw-sections, a concaved cushion of a soft material on one of said jaw-sections arranged to be fitted against the face of the tooth to be attached, and means on the other jaw-section for attaching a pin or stud on said tooth to the backing, substantially as and for the purposes set forth.

2. A dentist's tool for attaching porcelain teeth to a backing, comprising a pair of pivoted jaw-sections, a concaved cushion of a soft material on one of said jaw-sections arranged to be fitted against the face of the tooth to be attached, and a stud on the other jaw-section provided with means for flattening out the end of a pin or stud on said tooth and securing it to the backing, substantially as and for the purposes set forth.

3. A dentist's tool for attaching porcelain teeth to a backing, comprising a pair of pivoted jaw-sections, a concaved cushion of a soft material on one of said jaw-sections arranged to be fitted against the face of the tooth to be attached, and a screw-stud detachably connected with the other jaw-section, provided with means for flattening out the end of a pin or stud on said tooth and securing it to the backing, substantially as and for the purposes set forth.

4. A dentist's tool for attaching porcelain teeth to a backing, comprising a pair of pivoted jaw-sections 5 and 6, said section 5 having a perforation, a cushion of a soft material and a projection 10 on said cushion, arranged in the perforation of said section 5, and said cushion having a recessed portion arranged to be fitted against the face of the tooth to be attached, and means on the other jaw-section for attaching a pin or stud on said tooth to the backing, substantially as and for the purposes set forth.

5. A dentist's tool for attaching porcelain teeth to a backing, comprising a pair of pivoted jaw-sections 5 and 6, said section 5 having a perforation, a cushion of a soft material and a projection 10 on said cushion, arranged in the perforation of said section 5, and said cushion having a recessed portion arranged to be fitted against the face of the tooth to be attached, and a stud on the other jaw-section provided with means for flattening out the end of a pin or stud on said tooth and securing it to the backing, substantially as and for the purposes set forth.

6. A dentist's tool for attaching porcelain teeth to a backing, comprising a pair of pivoted jaw-sections 5 and 6, said section 5 having a perforation, a cushion of a soft material and a projection 10 on said cushion, arranged in the perforation of said section 5, and said cushion having a recessed portion arranged to be fitted against the face of the tooth to be attached, and a screw-stud on the other jaw-section detachably connected therewith, and provided with means for flattening out the end of a pin or stud on said tooth and securing it to the backing, substantially as and for the purposes set forth.

In testimony that I claim the invention set forth above I have hereunto set my hand this 25th day of June, 1900.

JOHN C. GRAFT.

Witnesses:
FREDK. C. FRAENTZEL,
GEO. D. RICHARDS.